Figure 1:
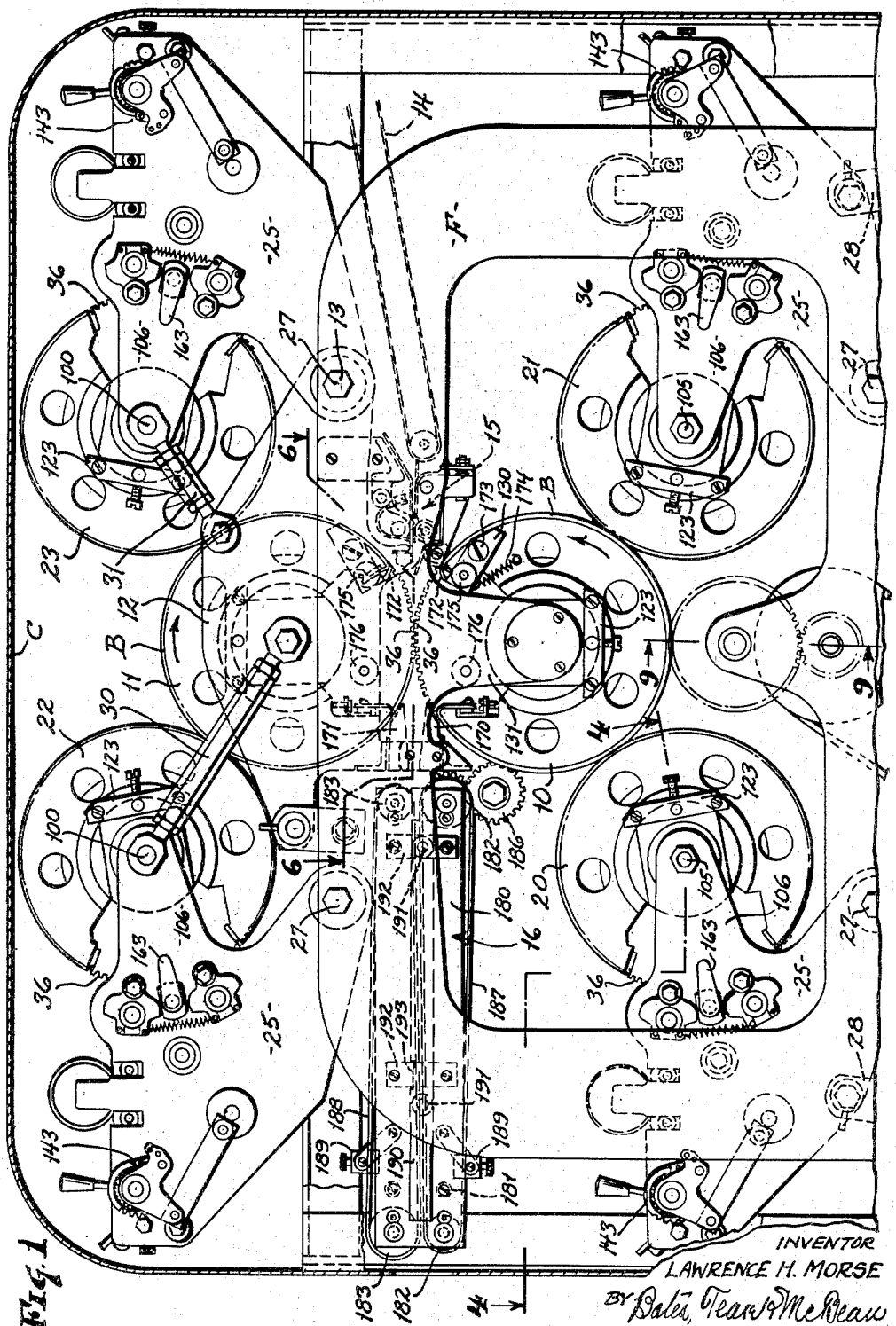

Oct. 17, 1950      L. H. MORSE      2,525,931
PLATE MOUNTING MEANS FOR ROTARY PRINTING MACHINES
Filed April 19, 1946      14 Sheets-Sheet 1

INVENTOR
LAWRENCE H. MORSE
BY Bates, Teare & McKee
ATTORNEYS

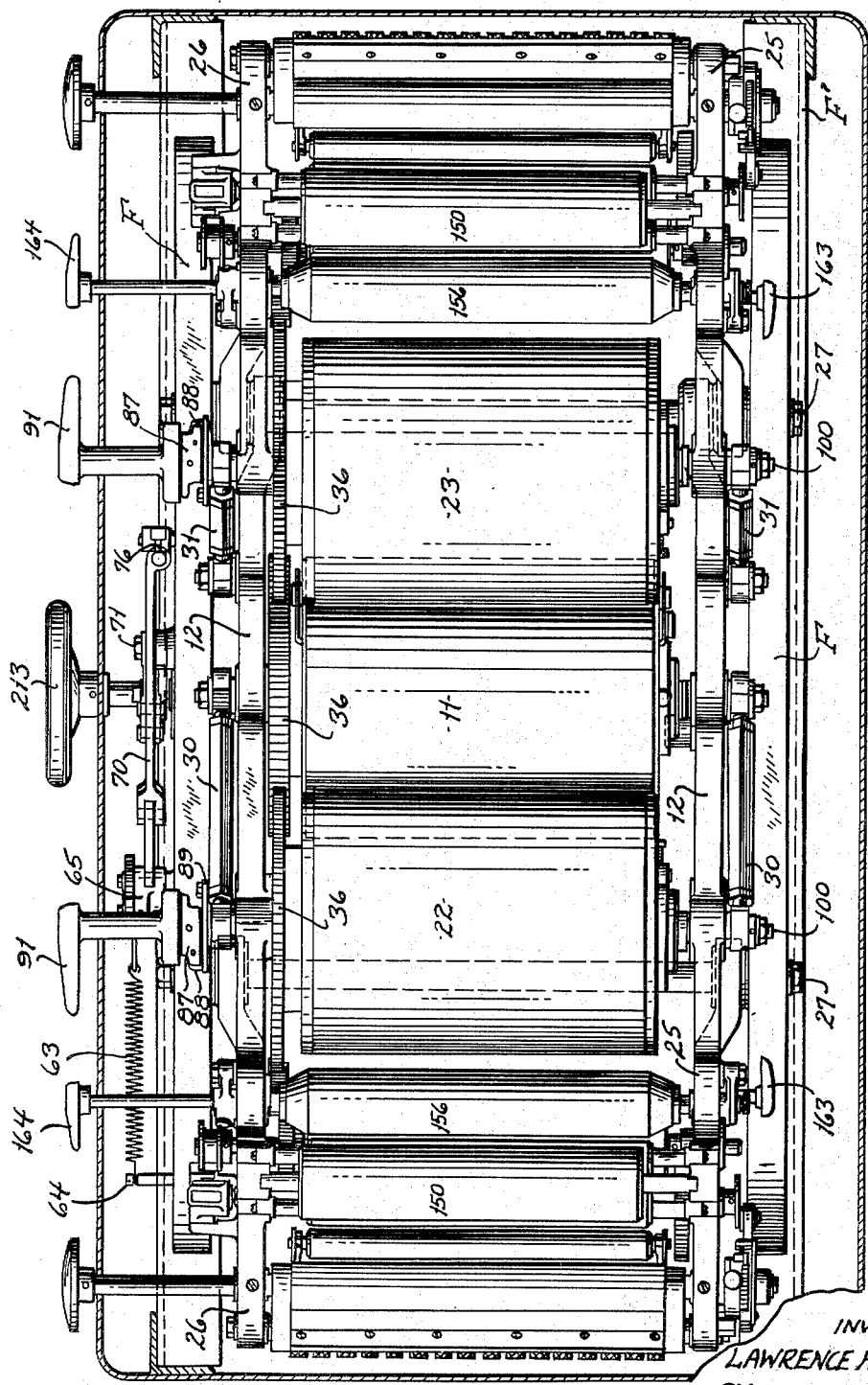

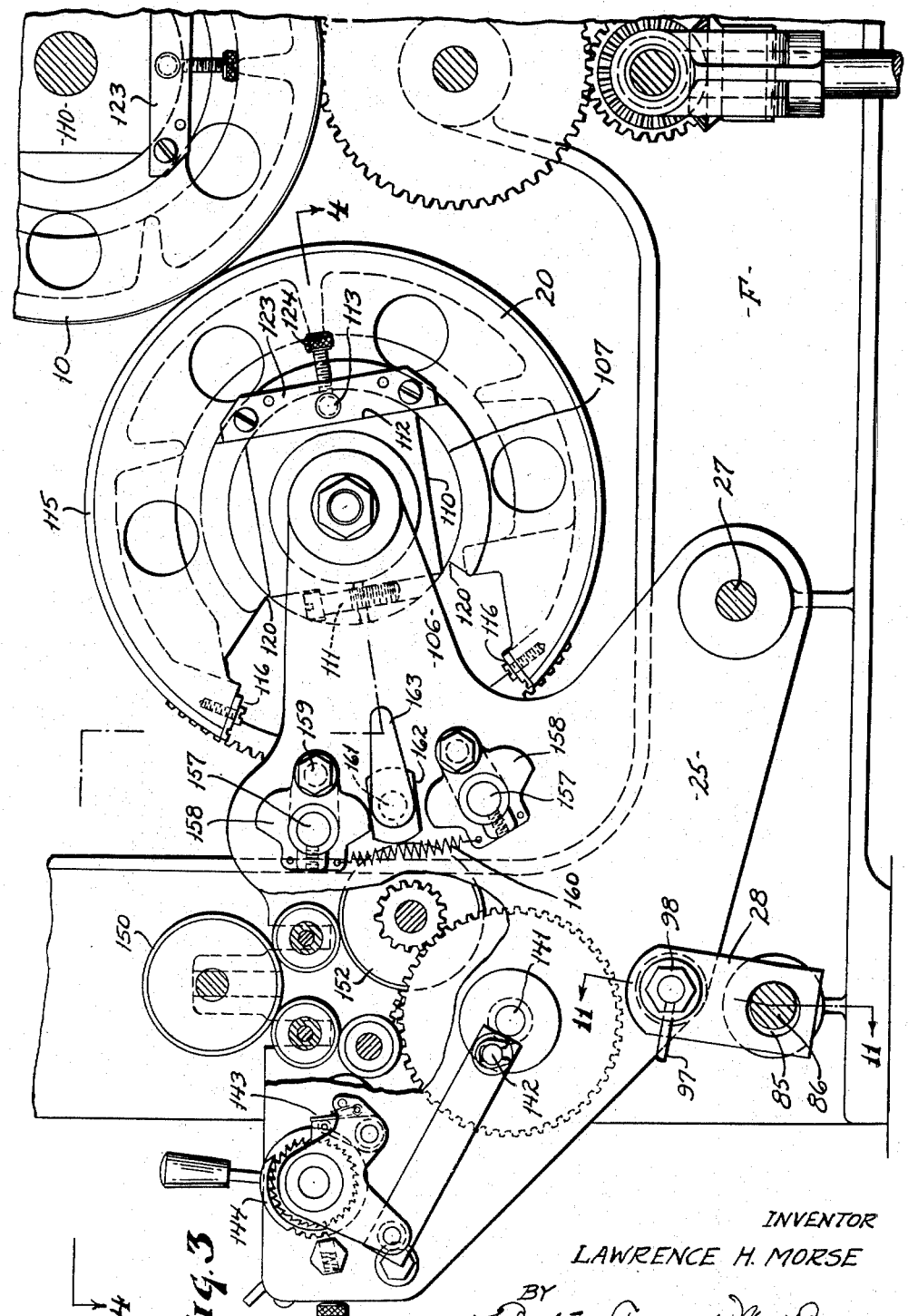

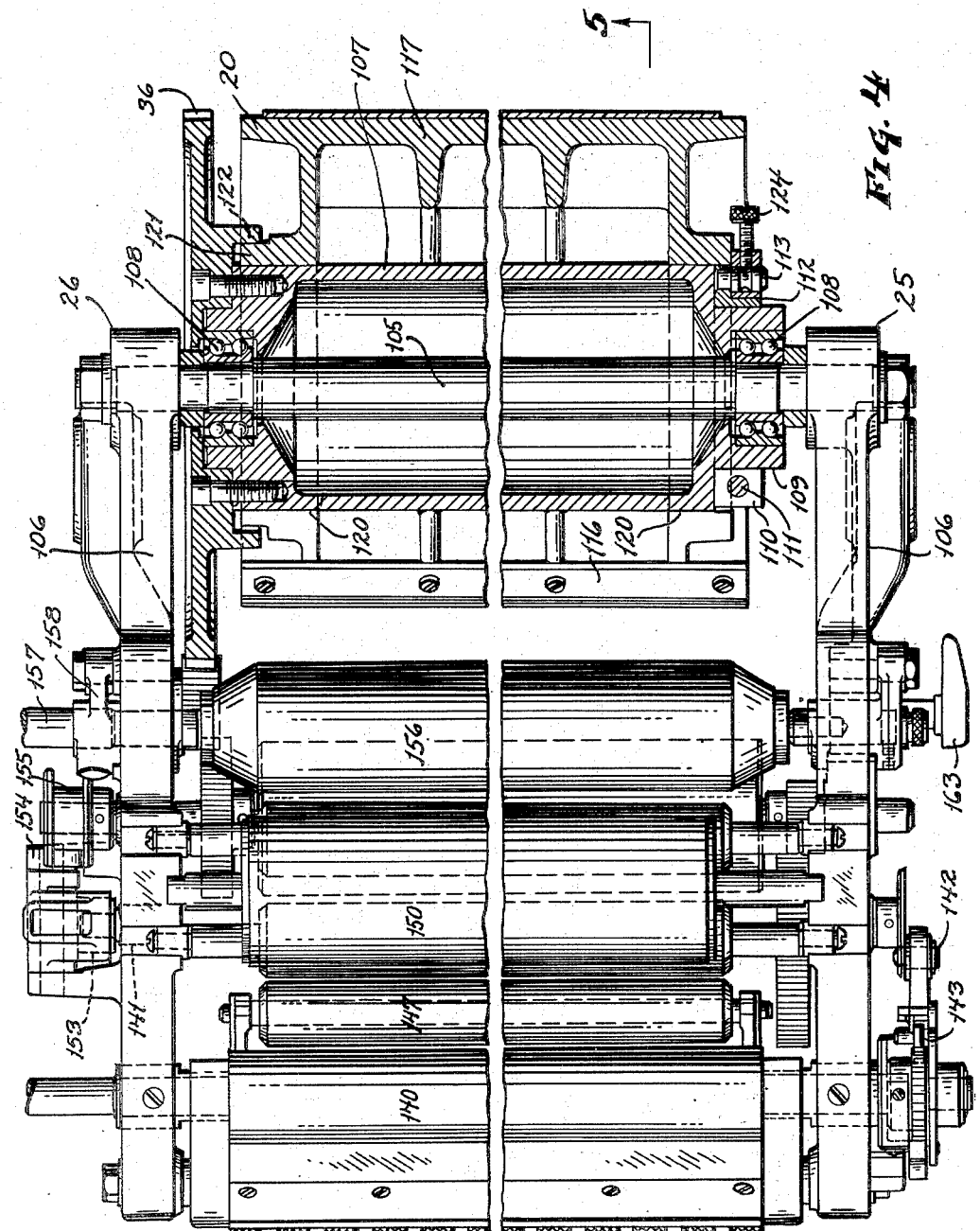

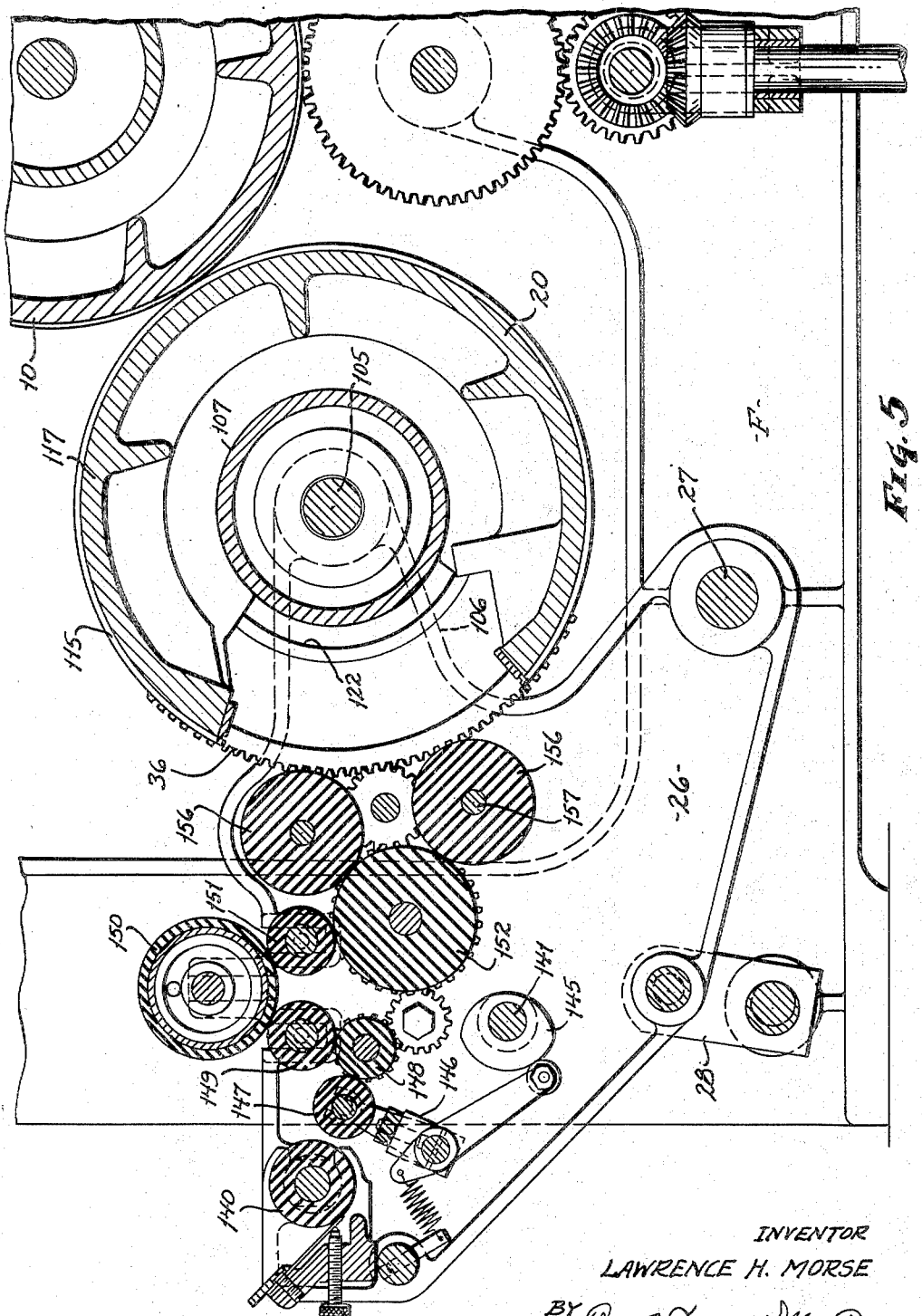

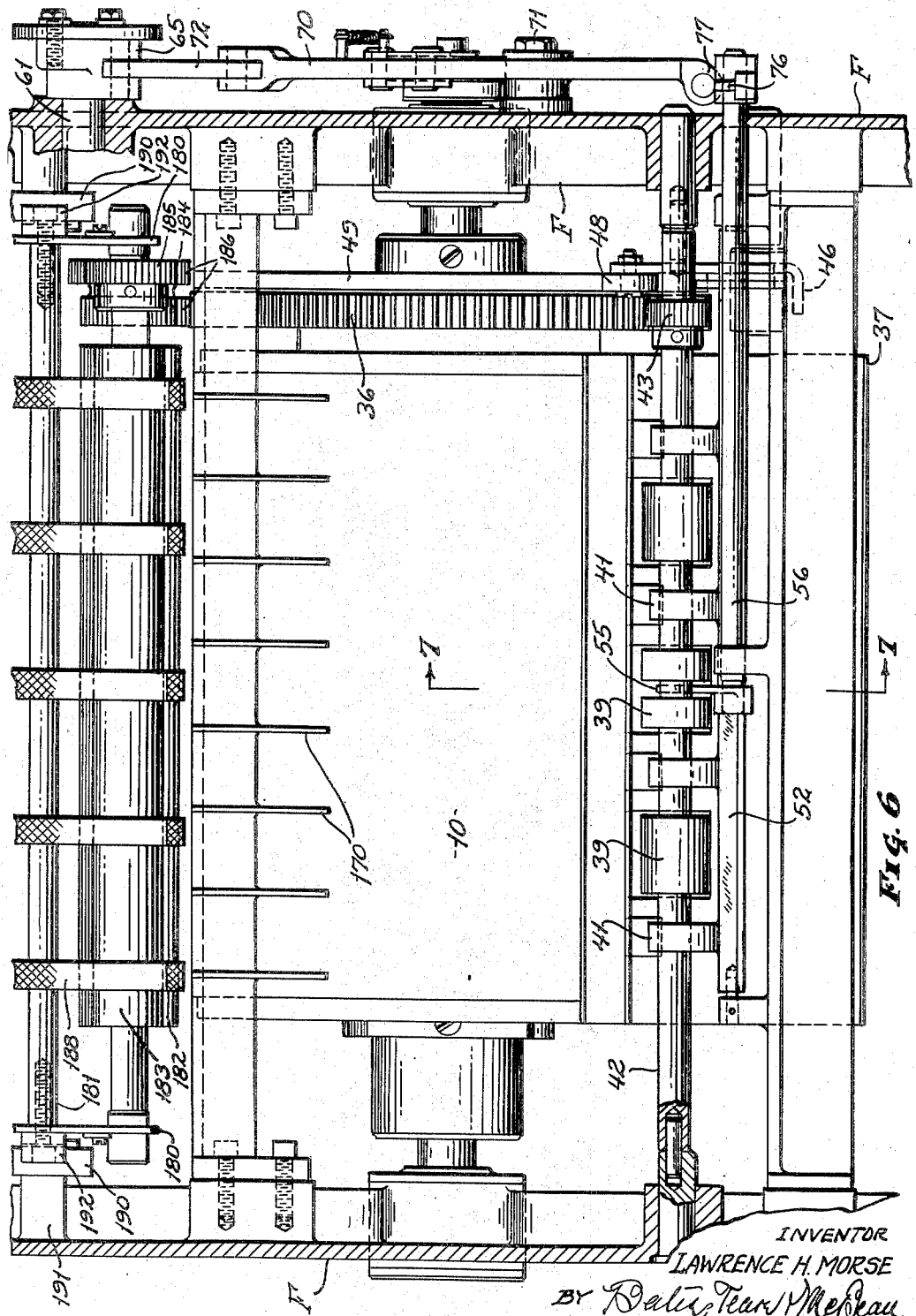

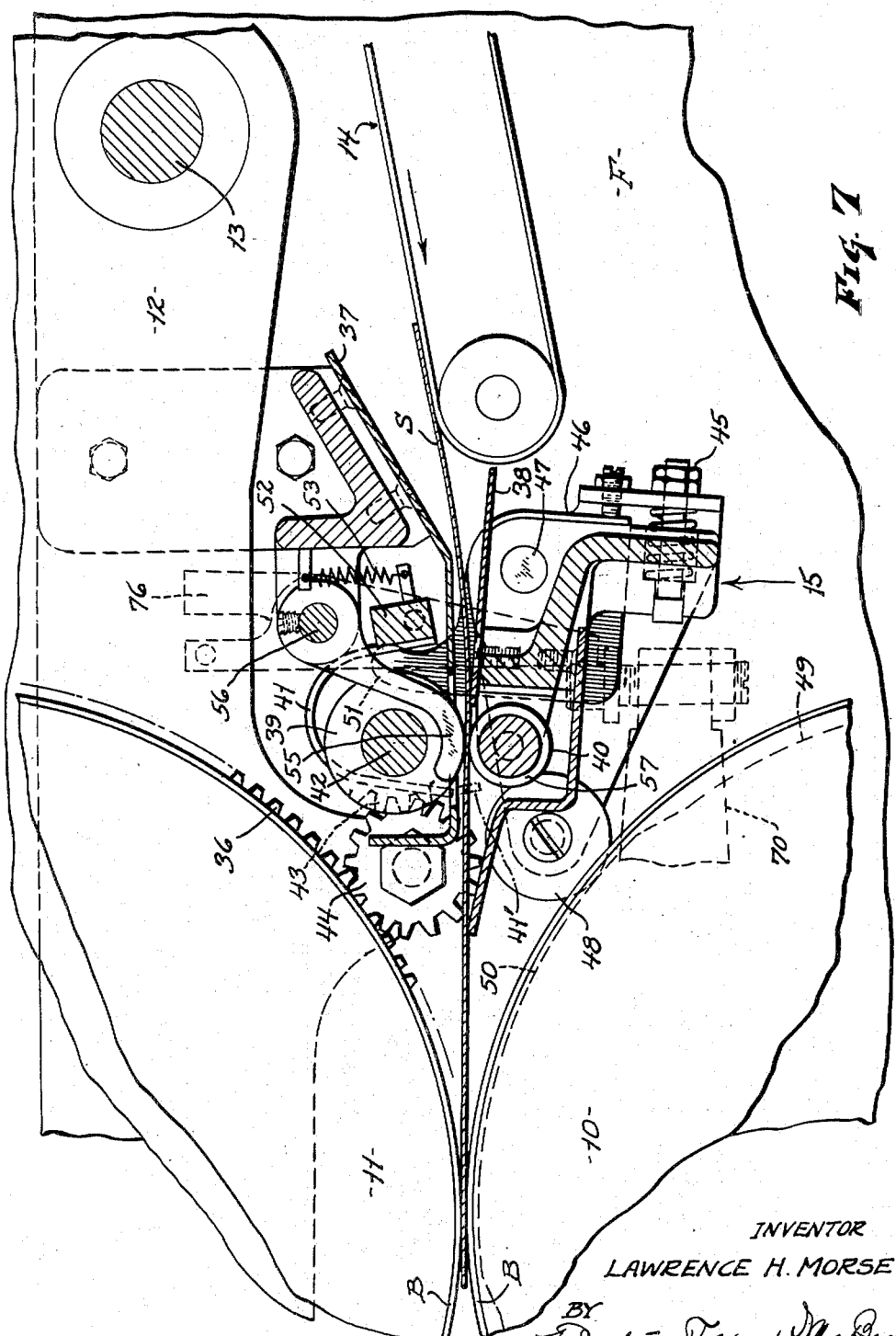

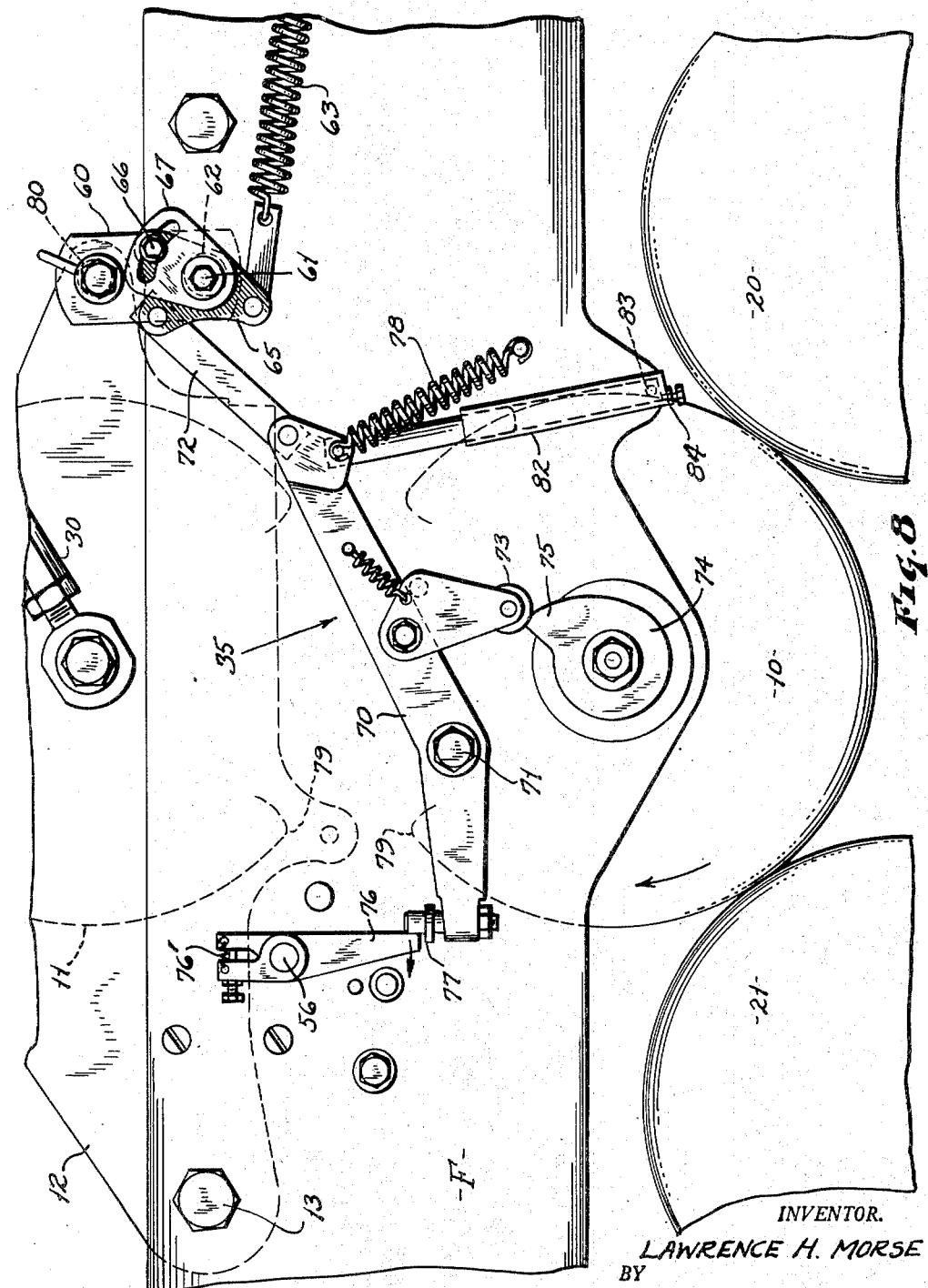

Oct. 17, 1950 L. H. MORSE 2,525,931
PLATE MOUNTING MEANS FOR ROTARY PRINTING MACHINES
Filed April 19, 1946 14 Sheets-Sheet 9

INVENTOR
LAWRENCE H. MORSE
BY Baler, Tear & McBean
ATTORNEYS

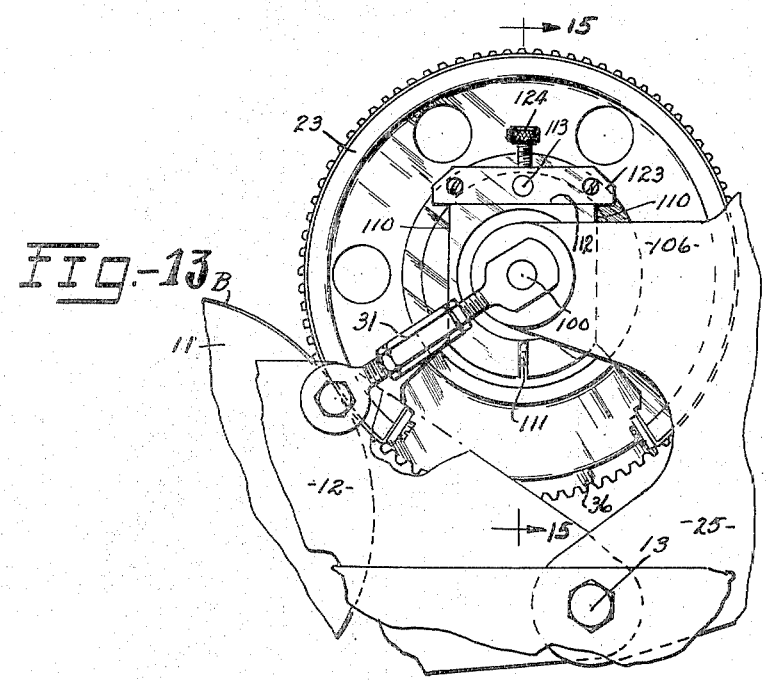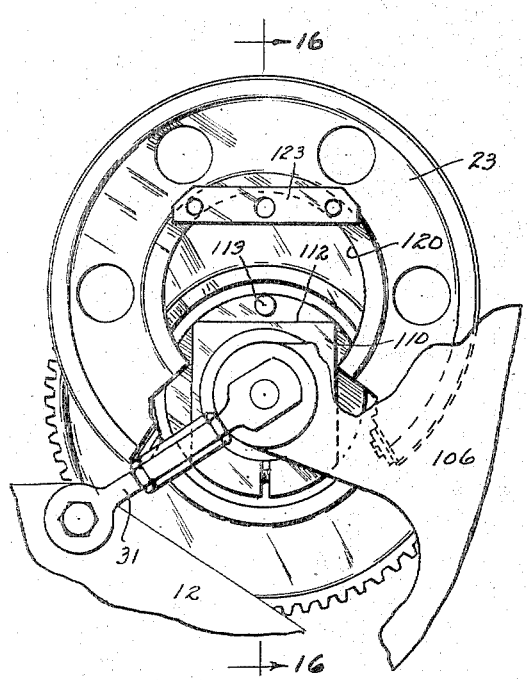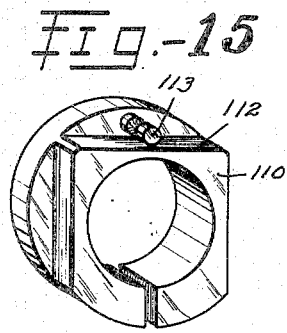

Oct. 17, 1950 L. H. MORSE 2,525,931
PLATE MOUNTING MEANS FOR ROTARY PRINTING MACHINES
Filed April 19, 1946 14 Sheets-Sheet 13

INVENTOR
LAWRENCE H. MORSE
By Bates, Teare, v McBean
ATTORNEYS

Oct. 17, 1950      L. H. MORSE      2,525,931
PLATE MOUNTING MEANS FOR ROTARY PRINTING MACHINES
Filed April 19, 1946      14 Sheets-Sheet 14

INVENTOR
LAWRENCE H. MORSE
BY Bates, Teare, & McBean
ATTORNEYS

UNITED STATES PATENT OFFICE 2,525,931

PLATE MOUNTING MEANS FOR ROTARY PRINTING MACHINES

Lawrence H. Morse, Mentor, Ohio, assignor to Addressograph-Multigraph Corporation, Cleveland, Ohio, a corporation of Delaware Application April 19, 1946, Serial No. 663,517

8 Claims. (Cl. 101—375)

This invention relates to printing machines and particularly to offset printing machines which print in one or more colors on one or both sides of a work sheet.

The act of printing on both sides of a sheet requires two offset rolls, and it is found convenient to have them directly opposed so that they may perform the function of platen rolls for each other. To prevent their offsetting upon each other, however, it is necessary that they be separated at all times except when a sheet of paper is passing between them. Therefore, one or the other of the offset rolls must be movably mounted. Since the pattern roll or rolls, from which the image is offset to the paper, must be kept in correct registration with the offset roll to maintain a clear image, it becomes necessary to move it or them, also, and in a proper fashion to preserve such registration.

An obvious expedient is to have the offset roll and the pattern rolls, along with their necessary inking devices, all mounted in a unitary structure and to cause this structure to move up and down to effect the offset roll separation. Such a structure, however, becomes exceedingly heavy when large rolls and inking devices are used, and much difficulty and complication is entailed in a mounting of it for rapid reciprocation.

An object of the present invention is to provide means whereby the various rolls are separately mounted for individual movement relative to the machine frame, and whereby such movements may be correlated to preserve the registration. This object is accomplished by providing separate frames for the movable offset roll and for each of its pattern rolls and associated inking mechanism. These frames are individually hinged to the main machine frame and are interconnected with a linkage for the proper control of their movement.

In a printing machine of this type, the offset rolls carry a blanket of rubber or similar composition, and the pattern rolls carry their patterns as embossed or intaglio plates, or as planographic plates. When changing the various blankets and plates, or when servicing the machine, it becomes necessary to remove the rolls. This removal, especially in the case of those rolls which are closely confined among the adjacent elements of the machine, imposes considerable difficulty and usually requires more or less dismantling of the adjacent parts.

Another object of the present invention is, therefore, the provision of means whereby the rolls may be readily removed. Accuracy of alignment of the roll shafts is imperative for accurate printing, and I accomplish the above objects without disturbing the shafts by providing cutouts in the rolls which clear the arms carrying the shaft bearings, in the case of those rolls which are endwise removable, and which clear their rotary supports on the shafts, in the case of those rolls which are radially removable.

Another object is to provide means which, dependent upon the presence or absence of a sheet in printing position, will raise or lower the movable offset roll and will also, through the linkage previously mentioned, move the coacting pattern rolls.

Other objects and advantages of the present invention will be made apparent by the following specification and claims and the appended drawings.

Figure 10:
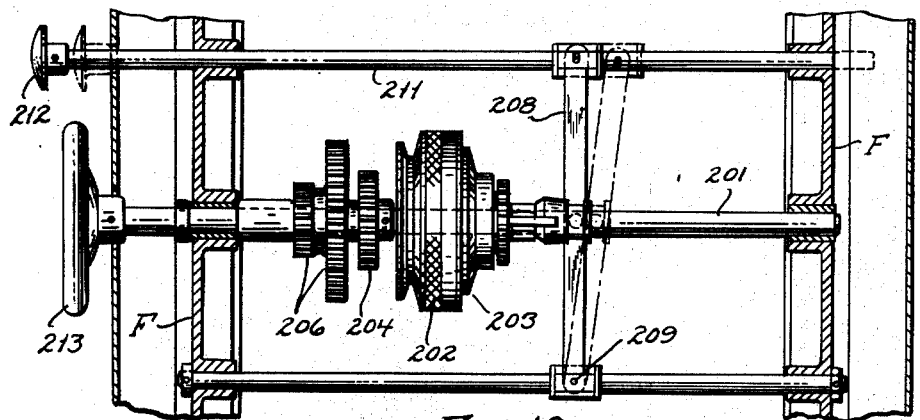
Figure 9:
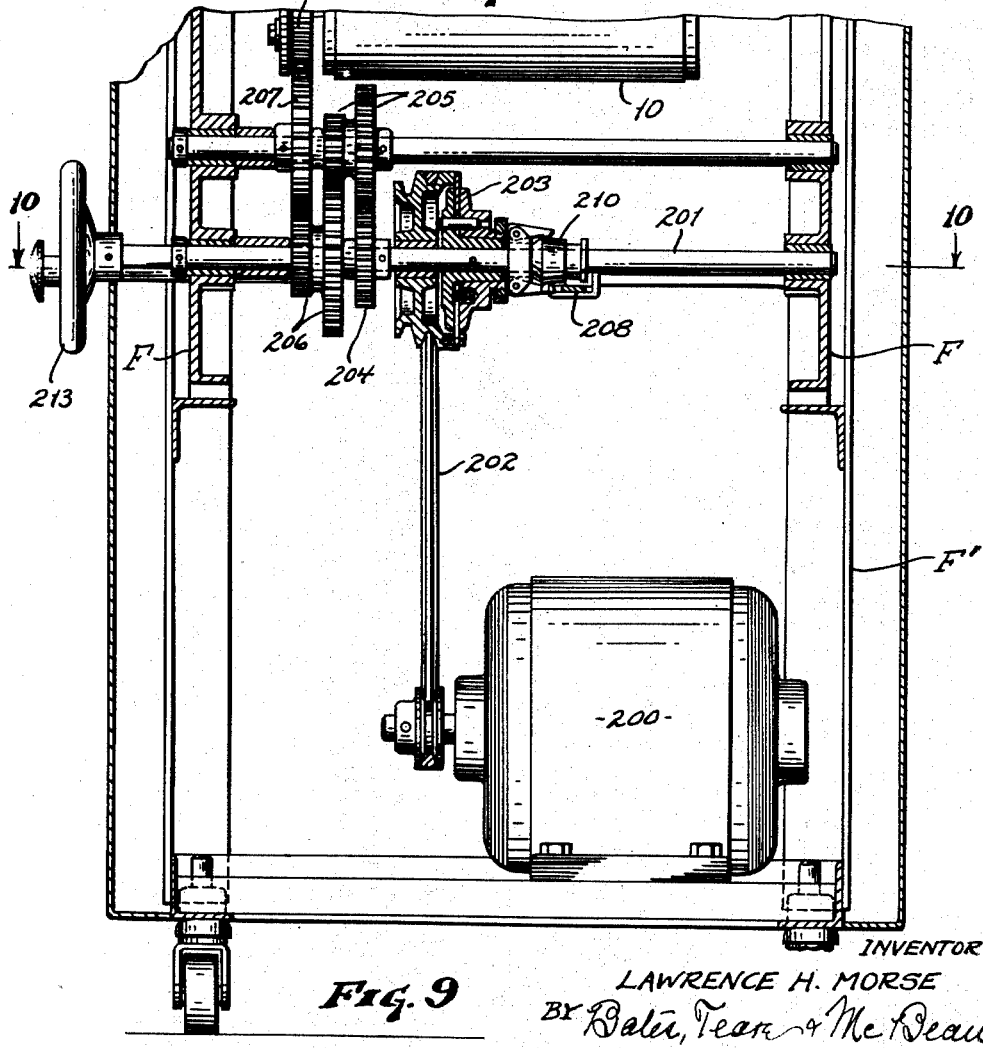
Figure 11:
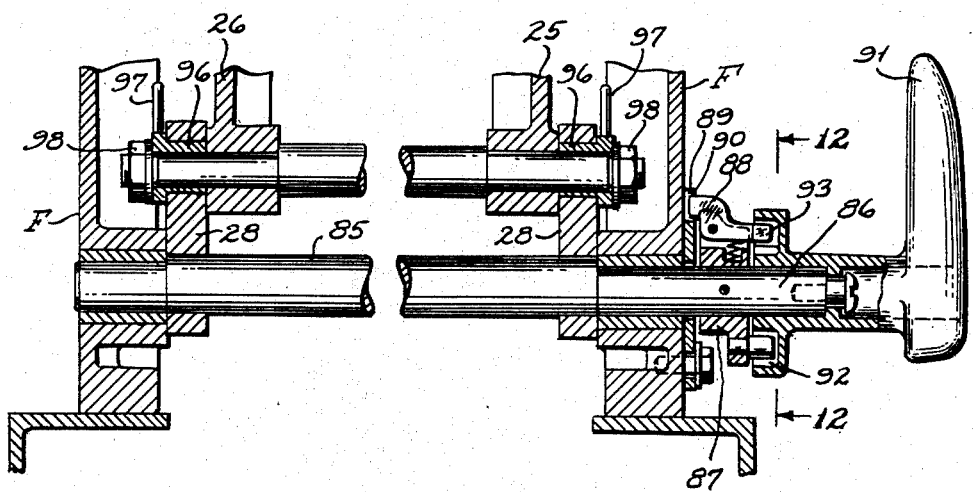
Figure 12:
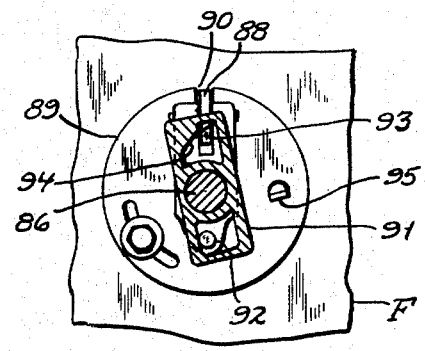
Figure 16:
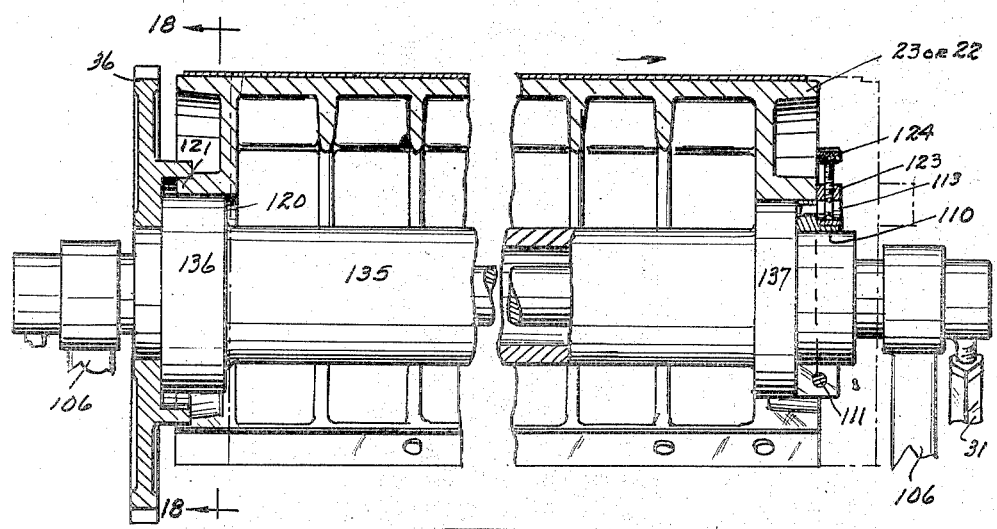
Figure 17:
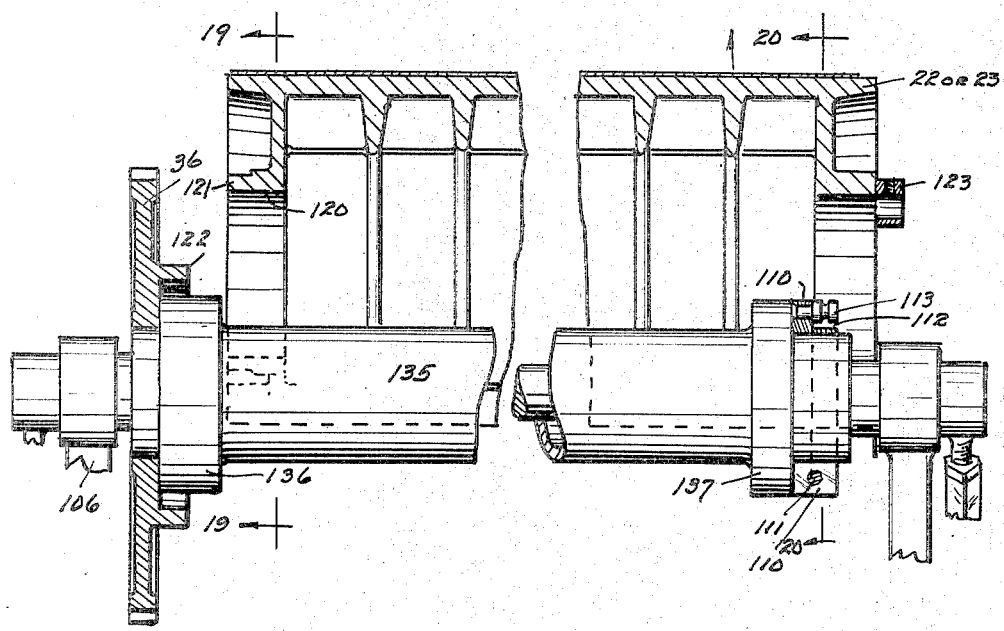
Figure 18:
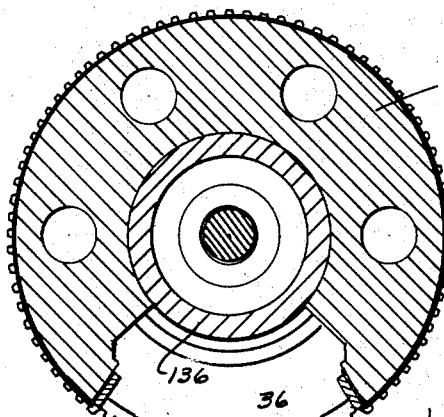
Figure 20:
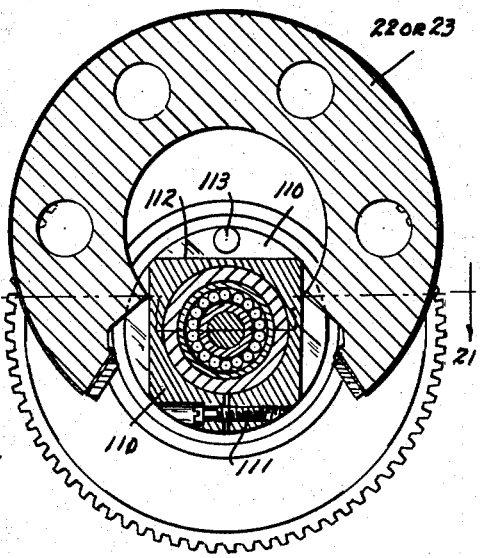
Figure 19:
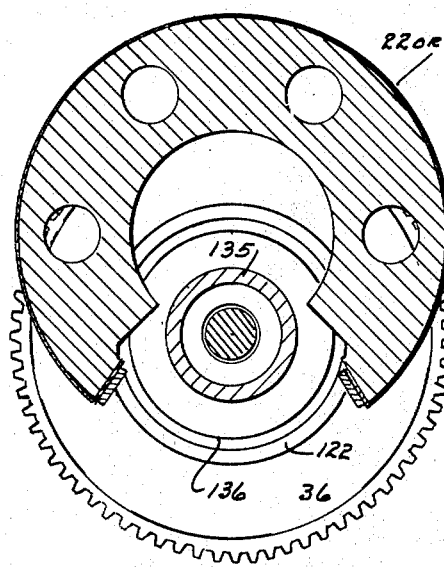
Figure 21:
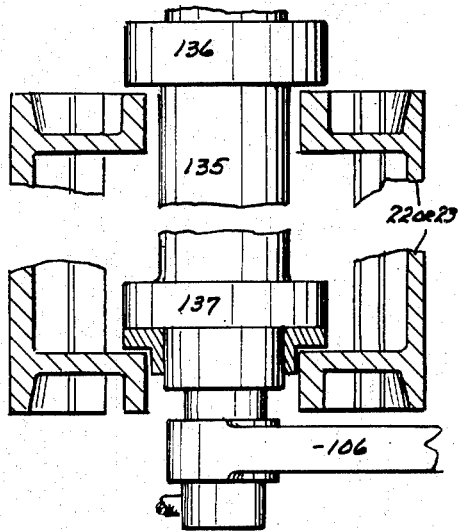
Figure 22:
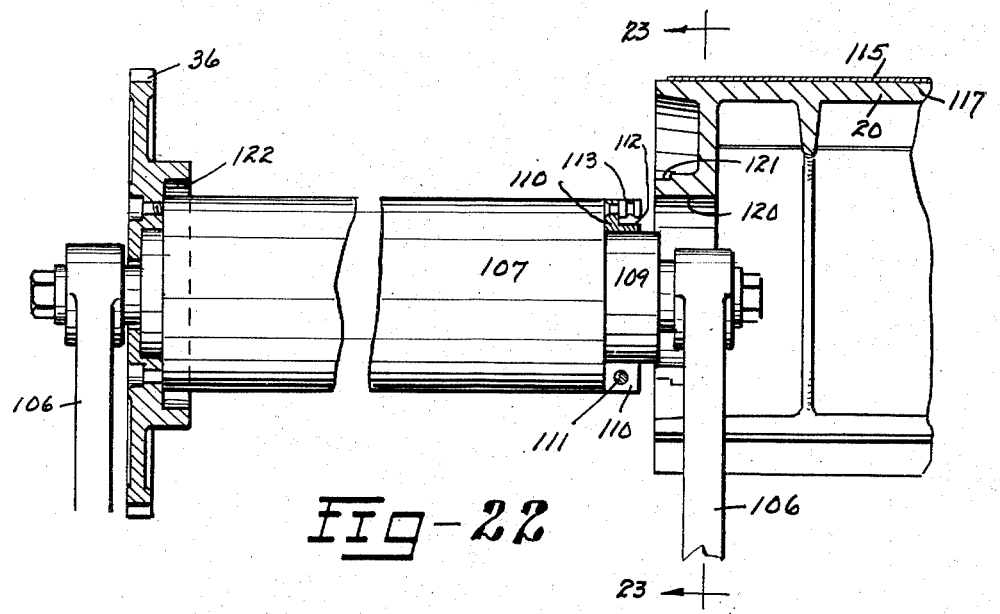
Figure 23:
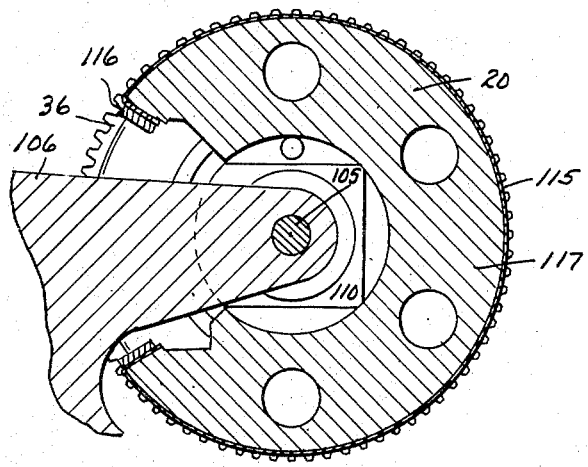

In the drawings, Fig. 1 is a rear elevational view of a printing machine embodying my invention; Fig. 2 is a top plan view of the same; Fig. 3 is an enlarged elevational view of one of the pattern rolls and its attendant inking mechanism; Fig. 4 is a horizontal section taken on the offset plane 4—4 of Figs. 1 and 3; Fig. 5 is a vertical section taken on the plane 5—5 of Fig. 4; Fig. 6 is a horizontal section taken on the offset plane 6—6 of Fig. 1 illustrating the lower offset roll and the paper feeding and detecting device; Fig. 7 is a vertical section, illustrating the latter device, taken on the plane 7—7 of Fig. 6; Fig. 8 is a fragmentary front elevational view of the machine illustrating the mechanism for moving the upper offset roll; Fig. 9 is a vertical section taken on the plane 9—9 of Fig. 1 illustrating the power drive; Fig. 10 is a horizontal section taken on the plane 10—10 of Fig. 9; Fig. 11 is a vertical section taken on the plane 11—11 of Fig. 3 illustrating a device for separating the pattern rolls from their respective offset rolls; and Fig. 12 is a transverse section taken on the plane 12—12 of Fig. 11; Fig. 13 is a side elevation of a portion of a machine illustrating an upper pattern roll mounted in position; Fig. 14 is a view similar to Fig. 13 and illustrating the shell of such roll in the act of being removed from its drum; Fig. 15 is a perspective view of a clamping block, forming part of the connection between the drum and shell; Figs. 16 and 17 are vertical sections illustrating the upper offset roll and either of the upper pattern rolls and showing the shell first as mounted on the drum and then in the act of being removed. The position of these sections with reference to one of the upper pattern rolls is indicated by the correspondingly numbered lines on Figs. 13 and 14 respectively. Figs. 18 and 19 are vertical sections taken along the correspondingly numbered lines on Figs. 16 and 17 respective; Fig. 20 is a transverse section as indicated by the line 20—20 on Fig. 17; Fig. 21 is a fragmentary sectional view indicated by the line 21—21 on Fig. 20; Fig. 22 is a fragmentary sectional view illustrating a lower pattern shell being removed from its drum in the press; Fig. 23 is a transverse section, as indicated by the line 23—23 on Fig. 22.

*Brief preliminary description*

In the preferred embodiment, illustrated generally in Fig. 1 of the drawings, I provide a printing machine having two offset rolls, the lower one 10 of which has a shaft fixedly carried by the main frame F, and the upper one 11 of which is carried by a swinging carrier comprising side plates 12 pivoted at 13 on the frame. The offset rolls are adapted to print upon opposite sides of a sheet which is delivered to the machine, by mechanism indicated conventionally at 14, and is fed to the rolls at the proper time by a paper feed and detecting mechanism indicated generally at 15. After printing, the sheet is delivered from the machine by an ejecting device 16.

Each offset roll may transfer a two-color image from two pattern rolls. The lower roll 10 receives a black image, for example, from the pattern roll 20 and a red image from the pattern roll 21, and the roll 11 receives its two colors from pattern rolls 22 and 23.

Each pattern roll is provided with an inking mechanism, the roll mounting and the inking mechanism comprising a unitary structure. For reasons of simplicity in manufacture and in servicing, these structures in the case of the four pattern rolls may be substantially identical; they are illustrated in detail in Figs. 3, 4, and 13 to 23 inclusive. As there shown, the pattern roll 20 is carried by a swinging frame comprising two side plates 25 and 26 which are pivoted at 27 on the main frame F and, in the case of the lower two pattern rolls, are supported by link blocks 28, best seen in Figs. 3 and 11, having eccentric mountings on the frame. In the case of the upper two pattern rolls, the side plates are similarly pivoted to the main frame but are supported by means of adjustable links 30 and 31 which tie them to the side plates 12 of the offset roll carrier.

To separate the offset rolls when the machine is not printing or when a sheet is inadvertently absent at the feeding position, I provide a separating mechanism 35 which, as shown in Fig. 8, is adapted to raise and lower the offset roll carrier 12 by turning an eccentric shaft which supports the carrier.

To drive the various rolls and to preserve their proper registration, each of the offset and pattern rolls is provided with a gear 36 whose pitch diameter is equal to the diameter of the roll. The gear which is associated with the lower offset roll is power driven by mechanism illustrated in Figs. 9 and 10.

*Paper feeding and detecting*

Referring now to Figs. 6 and 7, it will be noted that as a sheet S enters on the delivery mechanism 14 it is guided by plates 37 and 38 into the bite of a pair of feed rollers 39 and 40 which, in turn, move it into the bite of the offset rolls 10 and 11. Normally, the rollers 39 and 40 are separated so that no driving occurs, and a series of stop fingers 41 stand across the path of the paper, as indicated in broken lines at 41'. The leading edge of the sheet engages the fingers until, at the proper time in the cycle, the fingers are withdrawn and the feed rollers are engaged to move the sheet forwardly.

The upper roller 39 comprises a series of spaced sections, as shown in Fig. 6, on a shaft 42 carried in bearings on the main frame and provided with a gear 43. The gear is constantly driven from the gear 36 of the offset roll 11 through an idler 44.

The lower roller 40 is adjustably mounted, as indicated at 45, on a swinging frame 46 pivoted at 47 on the main frame F. The frame 46 carries a cam follower 48 which constantly engages a large disc cam 49 on the lower offset roll 10. The cam is provided with a short raised dwell 50 which, at the proper time in the rotation of the roll, is adapted to swing the frame 46 upwardly to press the roller 40, and hence the sheet S, against the rotating driving roller 39.

The frame 46 also carries an angularly adjustable extension 51 which bears against the supporting block 52 of the stop fingers. When the carrier 46 is rocked upwardly by the cam 49 the extension rocks the bar 52, against the action of a light tension spring 53, to withdraw the stop fingers immediately before the sheet is thrown forwardly by the feed rollers.

The presence of the sheet is detected by a feeler 55 which is carried by a shaft 56 and rests upon the paper. The sheet bridges a groove 57 in the feed roller 40 and, in the absence of a sheet, the feeler drops into the groove. The angular position of the shaft 56 is thus dependent upon the presence or absence of a sheet in feeding position and is adapted to control the raising and lowering of the upper offset roll, as will next be described.

*Separation of offset rolls*

As best seen in Fig. 8, the angular position of each of the side plates 12 of the upper offset roll carrier about its pivot 13 is determined by a support comprising a link 60. A cross shaft 61, having bearings in the main frame F, is provided with an eccentric portion 62 which pivotally supports the links. Rotation of the shaft is thus adapted to raise and lower the carrier to alter the spacing of the offset rolls 10 and 11. Normally the shaft is turned to roll separating position by means of a tension spring 63 which is anchored to the main frame at 64 (Fig. 2) and which urges counterclockwise a block 65 adjustably secured at 66 to a plate 67 which, in turn, is drivingly secured to the shaft.

Mechanism is provided whereby the shaft 61 is turned to lower the offset roll 11 to printing position during the non-printing portion of each cycle of the machine and whereby the presence or absence of a sheet in feeding position determines whether the roll remains in position to act upon the sheet, or whether it is again raised before the printing portion of the cycle commences, to prevent offsetting upon the other roll in the absence of a sheet. A bell crank 70 is pivoted at 71 on the main frame and is linked at 72 to the block 65. A cam follower 73 on the bell crank coacts with a cam 74 on the shaft of the lower offset roll 10 and, at the proper time in each cycle, a rise 75 on the cam lifts the bell crank to rock the block 65 in a clockwise direction to lower the roll 11.

The cam follower 73 may be hinged, as shown, on the bell crank whereby it may be idly swung out of the way when the cam 74 is rotated in the opposite direction, as during manual manipulation of the machine during the initial registration of the rolls.

The bell crank 70, having been raised to roll engaging position shown, is retained in such position when a sheet is properly present in the machine. The feeler shaft 56, previously mentioned, is provided with an arm 76, and the bell crank 70 carries an adjustable shoulder 77. When a sheet is absent, a spring, not shown, urges the feeler 55 downwardly into the groove of the feed roller 40 and swings the arm 76 in the direction of the arrow to idle position. As the rise 75 of the cam then leaves the cam follower, the spring 63 and a second tension spring 78 are free to rock the bell crank and the block 65 back to roll separating position. A sheet present at printing position, however, lifts the feeler and the arm 76 is swung to the position shown. As the shoulder 77 is lowered by the action of the cam 74, the arm is sprung aside, against the action of a light tension spring 76', and then snaps into the shoulder. The shoulder is prevented thereby from rising and the offset rolls are prevented from separating.

The offset rolls 10 and 11 are constructed with the usual gaps in their peripheries which provide for the attaching devices for their offsetting blankets. As indicated in Fig. 8, the positioning of the rolls occurs at a time in the cycle when their two gaps are in registration and before the leading edges 79 of their offset surfaces come into engagement.

Each of the side plates 12 of the offset roll carrier is individually hinged to the frame at 13 and each has an adjustable eccentric connection 80 with its respective supporting link 60. Differential raising or lowering of the two sides may thus be obtained in the initial adjustment for uniformity of printing pressure along the line of printing contact.

A dashpot 82 may be provided to prevent the shock which might be occasioned, when the bell crank 70 and its associated parts are released by the cam 74. The dashpot may be interposed as shown, between the bell crank and a pivotal anchorage on the main frame at 83 and may be controlled by a valve 84.

Rocking of pattern roll unit

As previously mentioned, each pattern roll is carried by a pair of side plates 25 and 26 which are pivoted to the main frame at 27. In the case of the roll 22, the side plates, as best shown in Figs. 1 and 2, are supported about their pivots by a pair of links 30 which extend from the shaft of the roll to the shaft of the upper offset roll. The links may be of the nature of turnbuckles as shown, whereby the shaft spacings at the front and the rear of the machine may be altered to obtain the required uniformity of contact of the rolls. As the upper offset roll is raised and lowered by the mechanism of Fig. 8, the pattern roll is thus rocked about the pivots 27 and the continued meshing of the gears 36 of the two rolls preserves proper registration.

The case of the upper pattern roll 22 or 23 is somewhat simpler in that the pivots 27 of its side plates may coincide with the pivots 13 of the upper offset roll carrier 12 (Figs. 1, 2, 8 and 13). Thus, by interconnecting the ends of the roll shaft with the side plates 12 by means of a pair of links or turnbuckles 31, there is produced, in effect, an integral structure. This structure is simply rocked around the pivot 13—27 by the raising and lowering mechanism of Fig. 8, and the proper registration of the two rolls is at all times preserved.

Release of pattern rolls from offset rolls

When the machine is standing idle or when the blankets or plates are to be changed, it is necessary to withdraw the pattern rolls from the offset rolls to prevent injury of the surfaces. In the case of the lower two rolls 20 and 21 this is accomplished by rocking the side plates about their pivots 27. As previously mentioned, each plate is supported by a link 28. As best seen in Figs. 3, 11 and 12, the links are pivotally supported on the eccentric portion 85 of a shaft 86 which extends across the main frame. When the shaft is oscillated the links move up and down to engage and disengage the pattern roll with the offset roll. The shaft is maintained in roll engaging position by means of a block 87 which is pinned to the shaft and which carries a pivoted dog 88. The dog is spring pressed into contact with the face of a disc 89, adjustably secured to the main frame, and, at the proper angular position of the shaft, it snaps into a notch 90 in the disc.

A handle 91 is provided to withdraw the dog from the notch and thereafter to turn the shaft. The handle is freely rotatable on the end of the shaft and has a limited angular movement relative to the block 87 by reason of a pin and slot connection at 92. The dog 88 is provided with a beveled extension 93 which is engaged by a beveled portion 94 of the handle during the first portion of the movement of the latter. Thus a clockwise movement of the handle from the position illustrated in Fig. 12 serves first to withdraw the dog from the notch and then to turn the block 87 and the shaft. When the block reaches a stop lug 95 on the disc the links 28 are lowered sufficiently to withdraw the pattern roll. The side plates 25 and 26 are individually positionable with respect to their links 28 by reason of eccentric bushings 96 having handles 97 for manual adjustment and clamping nuts 98 to retain the bushings in adjusted position.

Separation of the pattern rolls 22 and 23 from the upper offset roll accomplished by turning the eccentric center shafts 100 of the pattern rolls. The shafts are rotatable in bearings in the side plates 25 and 26 and the rolls rotate on ball bearings on an intermediate eccentric portion of the shaft corresponding to that at 85 of the shaft 86 just described. Each of the shafts 100 may be provided with a handle and positioning device comprising parts identical with those at 87 through 95 and the same reference characters have been repeated on the drawings (Fig. 1).

Removability of offset and pattern rolls

Each of the rolls may be removed from its shaft for servicing and for replacement of the printing surface. Referring to the lower pattern roll 20, best shown in Figs. 3, 4 and 5, and 22 and 23, it will be noted that the shaft 105 is carried non-rotatively by arms 106 of the side plates 25 and 26. A drum 107 revolves on a pair of ball bearings 108 on the shaft. The drum drivingly carries a gear 36 at one end and is provided with a reduced cylindrical portion 109 at the other end. A split block 110 is clamped upon the portion 109 in adjustable angular position, as by a clamping screw 111. The block is rabbeted at 112 and is provided with a grooved stud 113 for reasons later to be described.

The embossed or planographic plate 115 of the pattern roll is clamped, as at 116, on the cylindrical surface of a partial shell 117 which is longitudinally slidable on the drum 107. The shell has sufficient circumferential bearing on the drum, between the two edges 120 of Figs. 3 and 22, to insure accurate concentricity of the drum and shaft. The drum 107 is sufficiently large and the arms 106 of the side plate are sufficiently narrow to allow the gap in the shell to pass over the arms when the shell is moved longitudinally, as clearly indicated in Figs. 22 and 23.

The shell is rigidly held to the drum at the forward end by means of a lip 121 on the shell which passes beneath an overhanging rib 122 on the gear, and at the rear end by an engagement with the stud 113 of the split block. As best seen in Fig. 3, a bar 123 is rigidly secured across the end of the shell and is provided with an aperture having a sliding fit on the stud 113. When the shell is slid onto the drum the bar registers with the rabbeted block at 112 and is maintained in proper longitudinal position against the block by means of a thumb screw 124 which is carried by the bar and engages with the groove of the stud.

The construction and mounting of the pattern roll 21 may be identical with that just described while the lower offset roll 10 need differ only in that it is provided with appropriate attaching means for the rubber blanket and carries a sheet lifting device 130 later to be described. The offset roll is carried by depending arms 131 of the main frame F. The rear arm, as in the case of those at 106, is narrow enough to clear the gap in the shell.

In the case of the upper pattern rolls 22 and 23 endwise withdrawal is prevented by the links 30 and 31 and is unnecessary since there is unlimited clearance above when the cover C is removed. The shell and mounting of each of these rolls may be identical with that just described for the roll 20, differing only in the shape of the drum. To allow the shell to be withdrawn radially from the drum, the central portion 135 of the latter is reduced in diameter, as indicated in Figs. 16, 17 and 21. The end regions 136 and 137 are of the same diameter as before so that the parts, when assembled, appear in the positions shown.

To remove the shell 22 or 23 it need merely be released at 124 and slid lengthwise sufficiently for the lip 121 to clear the region 136. The shell may then be lifted off the drum in a radial direction, inasmuch as the the inner arcuate edges 120 of the shell can pass over the reduced diameter at 135 and the rectangular block 110. This is clearly indicated in Figs. 19, 20 and 21, showing the shell in the act of being removed.

The upper offset roll shell is identical with the lower offset roll shell except that the position of the sheet lifting device 130 (hereinafter described) is mounted in a left hand position on one shell and a right hand position in the other, as indicated in Fig. 1. The drum on which the upper offset shell is mounted is identical with the drums for the two upper pattern rolls and is as shown in Figs. 16 and 17. After the pattern rolls 22 and 23 are lifted off, the offset roll 11 may then, also, be similarly lifted off.

*Inking mechanism*

The particular form of inking mechanism for the pattern rolls is immaterial to my invention and a brief description only will be made of the illustrated embodiment. The inking systems for the four pattern rolls may be identical and, as illustrated in Figs. 3, 4 and 5, each comprises a series of rollers which conduct the ink from a fountain roller 140 to the pattern plate 115. A train of gears associated with the rollers derives power from the gear 36 of the pattern roll for the proper rotation of the rollers and of a cross shaft 141. The shaft carries a crank 142 for the reciprocation of the ratchet drive 143 for the fountain roll. An adjustable shroud 144 is provided for the ratchet wheel to control the action of the pawl in the usual manner.

The shaft 141 is also provided with a cam 145 which is adapted to rock the carrier 146 of a ductor roll 147, the latter serving to pass the ink intermittently to a receiving roll 148. The film of ink is smoothed out by passing in succession to rolls 149, 150 and 151 and thence to a distributing roll 152. The latter is reciprocated longitudinally by means of an eccentric 153, on the shaft 141, which serves to rock a bell crank 154 carrying a roller in engagement with a grooved head 155 secured to the roll shaft.

The ink is passed from the roll 152 to the printing plate by a pair of form rolls 156. The ends of the form roll shafts 157 are carried in swinging blocks 158 pivoted at 159 on the side plates. A tension spring 160 (Fig. 3), interconnecting the blocks, urges the form rolls into engagement with the pattern plate and the distributing roll. A cross shaft 161 extends between the side plates and carries a pair of throw-out cams 162 to spread the pairs of blocks 158, at either side of the device, to cause a slight separation of the rolls when the machine is standing idle. The cross shaft 161 is provided with a handle 163 at the rear of the machine. The form rolls may be carried on eccentric portions of their shafts whereby they may be individually withdrawn from the pattern roll by a turning of the handle 164, illustrated in Fig. 2, at the front of the machine.

*Printing operation*

With a sheet properly positioned in the feeding and detecting device 15, and with the upper offset roll in printing position, continued operation of the machine will project the sheet into the space caused by the gaps in the offset rolls. The rolls, in the meanwhile, are revolving and the leading edges of their offset blankets B engage the sheet at some point beyond its leading edge. The two-color images are then transferred to both sides of the sheet and, due to the tackiness of the ink, the sheet adheres usually to one or the other of the offset blankets. A series of stripping fingers is associated with each roll whereby the sheet, instead of continuing with the roll, will be directed to the ejecting device 16.

A lower series of stripping fingers 170 is rigidly carried by the main frame F, as illustrated in Figs. 1 and 6, while an upper series 171 is mounted on the carrier 12 of the upper offset roll. To lift the leading edge of the sheet from the roll, and thus allow the stripping fingers to penetrate beneath the sheet, each of the offset rolls is provided with a sheet lifting device 130 previously mentioned. Such device comprises a series of fingers 172 (Fig. 1) which normally lie below the periphery of the offset shell which carries them, immediately ahead of the leading edge of the blanket. The fingers are carried by a U-shaped bracket pivoted on the shell of the roll at 173 and resiliently held in idle position against a stop, not shown, by a spring 174. The bracket carries a roller 175 which, at the proper time, engages an abutment or roller 176 carried by the main frame. Two of such abutments are provided, as shown, for coaction with the devices of the respective offset rolls. This engagement rocks the bracket outwardly and the fingers 172 push the adhering sheet outwardly onto the stripping fingers 170 or 171, the fingers 172 passing through the gap between the latter.

Delivery from the machine

The ejecting or delivery device 16 comprises a frame which carries an upper and lower series of endless tapes between which the sheet is moved to the exterior of the machine. This frame is so mounted that it may be conveniently removed from and inserted into the main frame F of the machine during servicing operations. As shown in Figs. 1 and 6, the device comprises a pair of side plates 180 rigidly secured to spacing bars 181 and providing bearings for two pairs of rollers 182 and 183. The inner rollers are provided with gears 184 and 185 respectively, the former gear being adapted to mesh with an idler gear 186 when the frame is inserted into the machine. The idler is in constant engagement with the gear 36 of the lower offset roll. A series of endless tapes 187 and 188 pass around their respective rollers 182 and 183 and are maintained in proper position by adjustable spacing devices 189.

A track bar 190 is secured, as at 191, at each side of the main frame F and each of the side plates 180 is provided with a pair of recessed blocks 192 having a sliding fit on the track bar whereby the unitary device is supported in the machine and may be slid lengthwise therefrom. Each track bar is provided with a notch 193 into which the outer blocks 192 may drop when the device is in proper position adjacent the stripping fingers 170 and in engagement with the idler 186.

Power drive

As previously mentioned, each of the offset rolls and each of the pattern rolls is provided with a gear 36. These gears are in constant mesh with each other, the separation, formerly referred to, of the offset rolls and of the pattern rolls from the respective offset rolls being of insufficient extent to entirely withdraw the teeth. The lower offset roll 10 is power driven and serves to drive the others. Referring to Figs. 1 and 9, a preferred drive is illustrated in which a motor 200, mounted on the base frame F', drives a cross shaft 201 through a pulley belt 202 and a friction clutch 203. A pinion 204 on the shaft drives, through idlers 205, 206 and 207, the gear 36 of the lower offset roll. Engagement of the friction clutch may conveniently be effected by means of a bar 208 pivoted at 209 to the frame and adapted to slide a clutch operating member 210 into and out of engagement with the clutch. The bar 208 may have a pin and slot connection with a rod 211 which is adjustably slidable and is provided with a knob 212 for actuation by the operator. The shaft 201 may be provided with a hand wheel 213 for such manual positioning of the rolls as may be required during servicing of the machine.

As will be observed from the assembly views, my machine is very compact and hence comparatively small and comparatively light for an apparatus adapted to print at one time in two colors on both sides of a sheet. Simple means are provided for separating the different rolls from each other without disturbing their individual adjustment. Such separation prevents clogging from the drying of ink and allows the ready cleaning of the rolls, and may also be employed as to some of the rolls when it is desired to print only one color on one or on both sides of the sheet or desired to print in one or two colors on one side only.

The frame of the machine and the supports for the different rolls are so devised that the shells of all the rolls may be readily withdrawn to enable change in their printing forms. The shells of the four pattern rolls are of identical form and size and may be interchanged, if desired.

The feeding of sheets to the machine is very readily effected and is under control of a detector mechanism to prevent the offset rolls impressing each other in case of absence of a sheet in the feeding mechanism. The delivery mechanism is likewise simple and is enclosed within the casing of the machine. This delivery mechanism is self-contained and is readily withdrawable as a unit to allow access to the printing region.

I claim:

1. In a printing machine, a pair of spaced frame members, a drum rotatably mounted between and supported by said frame members, a segmental cylindrical shell mounted on said drum and having an internal segmental annular surface adjacent each end to engage axially spaced portions of the drum periphery, said shell having a gap extending therethrough and axially from end to end thereof, the width of said gap at said inner annular surfaces being smaller than the diameter of the shell supporting portions of said drum, the portion of the drum intermediate said shell supporting portions and a portion thereof between one shell supporting portion and its adjacent frame member having a diameter smaller than said gap width and an axial extent greater than that of the drum supporting regions, said shell having a portion intermediate said internal annular surfaces having a greater axial extent and gap width than the length and diameter respectively of the end portions of the drum, whereby said shell may be slid axially of said drum to disengage the shell from the end portions of the drum and then moved axially to remove the shell, and releasable means to hold the shell in position on the drum.

2. In a printing machine, a pair of spaced frame members, a shaft carried by and extending between said members, a drum rotatably mounted on said shaft and spaced inwardly at one end from the adjacent frame member, a segmental cylindrical shell mounted on said drum and having an internal segmental annular surface adjacent each end to engage the end portions of the periphery of said drum, said shell having a gap extending entirely therethrough and axially from end to end thereof, the width of said gap at said inner annular surfaces being smaller than the diameter of the shell supporting portion of said drum, said drum having a region intermediate said shell supporting portions having a diameter smaller than said gap width, said shell having a portion intermediate said internal annular surfaces having a greater axial extent and gap width than the length and diameter respectively of the end portions of the drum, whereby said shell may be slid axially of said drum to disengage the shell from the end portions of the drum and then moved axially to remove the shell, and releasable means to hold the shell in position on the drum.

3. In a printing machine, a pair of spaced frame arms, a drum rotatably mounted between said arms, a segmental cylindrical shell mounted on said drum and having an internal segmental annular surface adjacent each end to engage the end portions of the periphery of said drum, said shell having a gap extending entirely therethrough and axially from end to end thereof, the width of said gap at said inner annular surfaces being smaller than the diameter of the shell supporting portion of said drum, releasable means to secure the shell in position on said drum, said drum having a region intermediate said shell supporting portions having a diameter smaller than said gap width, said shell intermediate said internal annular surfaces having a gap width greater than the diameter of the end portions of the drum, said shell being slidable axially of said drum to disengage the coacting surfaces of the drum and shell and then removable from the drum by an axial movement of the shell.

4. In a printing machine, a pair of spaced frame members, a drum extending between and mounted for rotation in said frame members and having cylindrical shell supporting arms adjacent its ends, a cylindrical shell mounted on said drum and having an internal substantially annular surface adjacent its ends to engage the periphery of said drum, said shell having a gap extending radially through the shell and axially from end to end thereof, the width of said gap at said inner annular surface being smaller than the diameter of the shell supporting portion of said drum, one end of said drum having an axially extending portion of reduced diameter, a block rotatably mounted on said portion, means to clamp the block to the drum against axial movement and in an adjusted angular position relative thereto, a shell positioning member fixed to said block, said shell being slidable axially of said drum across said block, and releasable means carried by the drum and coacting with said positioning means to retain the shell in a fixed position relative to said block, whereby said shell is retained on said drum and is restrained against axial movement relative to said drum by engagement of said inner annular surfaces with said drum and is restrained against rotative movement relative to said drum by said positioning means.

5. In a printing machine, a pair of spaced frame members, a shaft extending between and secured to said frame members, a cylindrical drum mounted for rotation on said shaft, a cylindrical shell mounted on said drum and having an internal substantially annular surface to engage the periphery of said drum, said shell having a gap extending entirely through the shell and axially from end to end thereof, the width of said gap at said inner annular surface being smaller than the diameter of the shell supporting portion of said drum, a gear mounted on one end of said drum and having an annular flange extending over said drum and spaced from the periphery thereof, the opposite end of said drum having a portion having reduced diameter, a sleeve rotatably mounted on said portion, means to clamp the sleeve to the drum in any desired angular position relative thereto, a shell positioning member fixed to said sleeve, said shell being slidable axially of said drum and having a flange at one end adapted to engage the inner periphery of said gear flange, and releasable means carried by the other end of said shell and coacting with said positioning means to retain the shell in position on said drum whereby the shell is restrained against both axial and rotative movements relative to the drum when in position thereon.

6. In a printing machine, a pair of spaced frame members, one of said members comprising an arm, a cylindrical drum extending between and mounted for rotation in said frame members, a substantially cylindrical shell mounted on said drum and having an internal annular surface to engage the periphery of said drum, said shell having a gap extending entirely through the shell and axially from end to end thereof, the width of said gap at said inner annular surface being smaller than the diameter of said drum and the width of the gap being larger than the width of said arm, an abutment at one end of said drum against which one end of said shell abuts, the opposite end of said drum having a portion having a reduced diameter, a block rotatably mounted on said portion, means to clamp the block to the drum in an adjusted angular position relative thereto, a shell positioning member fixed to said block, said shell being slidable axially of said drum out of engagement with said abutment across said block and arm, and releasable means carried by the drum and coacting with said positioning means to retain the shell on said drum in a fixed position relative to said block.

7. In a printing machine, a pair of spaced frame arms, a drum rotatably mounted between said arms, a segmental cylindrical shell mounted on said drum and having an internal segmental annular surface adjacent each end thereof to engage the end portions of the periphery of said drum, said shell having a gap extending entirely therethrough and axially from end to end thereof, the width of said gap at said inner annular surfaces being smaller than the diameter of the shell supporting portion of said drum, said drum having an outward extending portion at one end having a reduced diameter, a block rotatably mounted on said last named drum portion, means to clamp the block thereto in an adjusted angular position relative to said drum, a shell positioning member fixed to said block, said shell being slidable axially of said drum across the block and the adjacent frame arm, and a member carried by the drum and coacting with said positioning means to retain the shell in position on said drum against both axial and rotative movement relative thereto, one of said members being releasable whereby said shell may be slid axially to remove the shell from the drum.

8. In a printing machine, a pair of spaced frame arms, a shaft carried by and extending between said arms, a drum rotatably mounted on said shaft, a segmental cylindrical shell mounted on said drum and having an internal segmental annular surface adjacent each end to engage the end portions of the periphery of said drum, said shell having a gap extending entirely therethrough and axially from end to end thereof, the width of said gap at said inner annular surfaces being smaller than the diameter of the shell supporting portion of said drum, said drum having a region intermediate said shell supporting portions having a diameter smaller than said gap width, said shell having a portion intermediate said internal annular surfaces having a greater axial extent and gap width than the length and diameter respectively of the end portions of the drum, one end of the drum having a portion having a reduced diameter extending outwardly therefrom a block rotatably mounted on said portion, means to clamp the block to the drum in an adjusted angular position relative thereto, a shell positioning member fixed to said sleeve, said shell being slidable axially of said drum across the block out of engagement with said abutment, and means carried by the drum and coacting with said positioning means to retain the shell in position on said drum against both axial and rotative movement relative thereto, whereby said means may be released and the drum slid axially to disengage the coacting surfaces of the drum and shell and then removable from the drum by an axial movement of the shell.

LAWRENCE H. MORSE.

REFERENCES CITED

The following references are of record in the file of this patent:

UNITED STATES PATENTS

| Number | Name | Date |
|---|---|---|
| 842,265 | Swift | Jan. 29, 1907 |
| 1,027,384 | Green | May 21, 1912 |
| 1,317,647 | Bechman | Sept. 30, 1919 |
| 1,554,597 | Rowles | Sept. 22, 1925 |
| 1,590,742 | Goulding | June 29, 1926 |
| 1,824,584 | Wood | Sept. 22, 1931 |
| 1,870,117 | Henderson | Aug. 2, 1932 |
| 1,852,918 | Hartley | Mar. 27, 1934 |
| 1,968,848 | Morse | Aug. 7, 1934 |
| 1,992,613 | Hartley | Feb. 26, 1935 |
| 2,158,707 | Jirousek | May 16, 1939 |
| 2,406,205 | Davidson et al. | Aug. 20, 1946 |
| 2,460,504 | Huebner | Feb. 1, 1949 |

FOREIGN PATENTS

| Number | Country | Date |
|---|---|---|
| 222,993 | Great Britain | Oct. 16, 1924 |
| 226,816 | Great Britain | May 7, 1925 |